Patented Nov. 1, 1949

2,486,440

UNITED STATES PATENT OFFICE 2,486,440

PRODUCTION OF PHENAZONIUM DYESTUFF IMAGES

Willy A. Schmidt, Easton, Pa., and Vsevolod Tulagin, Phillipsburg, N. J., assignors to General Aniline & Film Corporation, New York, N. Y., a corporation of Delaware No Drawing. Application January 10, 1946, Serial No. 640,382

14 Claims. (Cl. 95—88)

The present invention relates to color photography and more particularly to the method of producing in photographic elements phenazonium dyestuff images by color forming development and to the developers for producing such dyestuff images.

One of the best known methods for forming dyestuff images in photographic elements involves that of color forming development which originated with Fischer and which is described in Fischer U. S. P. 1,102,028. The essentials of this method comprise the exposure of a photographic silver halide emulsion and the development of the exposed emulsion with a primary aromatic amino developer, preferably a p-dialkylamino aniline in the presence of a color former. By this procedure there is formed in situ with the silver image an azo methine or quinoneimine dyestuff image. The silver image is removed with mild oxidizing agents such as alkali ferricyanides which do not affect the dyestuff image.

The color-forming components which react with the oxidation products of the primary amino developer to form the azo methine or quinoneimine dyes are generally typified by the presence of an active methylene group, a phenolic hydroxyl group, or a primary amino group. It is possible while suitably selecting the color-forming components, to produce in a multilayer film by this method the subtractively colored images, to wit, yellow, magenta and cyan.

Many improvements have been wrought upon the basic process of Fischer. However, almost universally such improvements employ the fundamental reaction described by Fischer in which a 4-dialkyl amino aniline is used for development of an exposed silver halide emulsion in the presence of a color component which forms with the oxidation products of such developer, azo methine and quinoneimine dyestuff images.

While these images are in general fairly satisfactory, they do suffer from the disadvantages of lack of stability to acids, alkalies, sulfur dioxide solutions and the like. They also have a tendency to fade after storage for a long period of time.

It has been proposed in the dyestuff art to utilize for the dyeing of textiles, compounds of the class known as phenyl phenazonium dyes. These products are produced by the reaction of a plurality of aromatic amines in the presence of air or an oxidizing agent such as chromic acid. Said compounds, which are typified by the following general structure (in which K represents amino or OH radicals and X and acid radical),

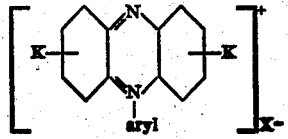

are very stable as compared to the quinoneimine and azo methine dyes. They are, for instance, resistant to acids, alkalies, sulfur dioxide and dilute acid dichromate solutions. If it were possible to produce dyestuff images from such dyes by color development, the main objections to the Fischer process, to wit, lack of stability of the dyestuff images, would be removed.

We have now discovered that if an exposed photographic silver halide emulsion be developed with a particular class of aromatic triamines in the presence of a conventional color former, phenazonium dyes are produced in situ with the silver image. In certain cases, depending upon the particular triamine and color former selected, such dyes appear to be formed spontaneously. In other cases, the formation of an intermediate quinoneimine dyestuff image is observed, but such image may be readily converted to the desired phenazonium dyestuff image by acidification with acids or acid reacting solutions, i. e., acid cuprous chloride solutions. Once the image has been so converted to the phenazonium dyestuff image, it is stabilized and is no longer influenced by acids or alkalies as previously stated.

It is accordingly an object of our invention to produce photographic elements containing a phenazonium dyestuff image.

A further object of our invention is to produce phenazonium dyestuff images by color forming development.

A further object of our invention is to produce phenazonium dyestuff images by color developing an exposed silver halide emulsion with a particular triamine in the presence of a color forming component.

A further object of our invention is a color forming developer containing as the active developing agent a particular aromatic triamine.

A further object of our invention is a color forming developer containing a color forming component and as the developer an aromatic triamine.

A further object of our invention is a photographic element containing a phenazonium dyestuff image.

Other and further important objects of the invention will become apparent as the description proceeds.

The aromatic triamines which we utilize as the color developers for production of the phenazonium dyestuff images are those of the following structure:

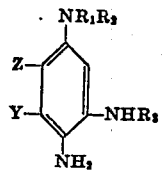

wherein $R_1$ is hydrogen or an aliphatic radical such as alkyl, i. e., methyl, ethyl, propyl, butyl, amyl and the like, carboxy alkyl such as carboxy methyl, carboxy ethyl, carboxyl butyl and the like, sulfoalkyl such as sulfomethyl, sulfopropyl, sulfobutyl and the like, $R_2$ is hydrogen, aliphatic as above, or an aromatic radical such as aryl, i. e., phenyl, naphthyl and the like, carboxyaryl, i. e., carboxy phenyl, carboxynaphthyl and the like, sulfoaryl, such as sulfophenyl, sulfonaphthyl and the like, alkoxyaryl such as methoxyphenyl, methoxynaphthyl, ethoxyphenyl, butyroxyphenyl and the like, alkylaryl such as toluyl, ethylphenyl, propylphenyl and the like, $R_3$ is an aromatic or aliphatic radical as illustrated above, and Z and Y are hydrogen, sulfo or carboxy or together represent the atoms necessary to complete a six-membered isocyclic ring system such as benzo and the like.

The following compounds are illustrative of the aromatic triamines contemplated by the present invention:

1

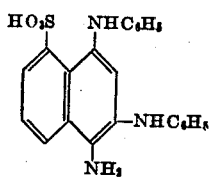

5-amino-6.8-bis-(phenylamino)-1-naphthalene sulfonic acid

2

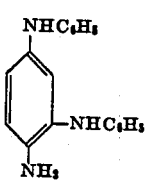

2.4-bis-(phenylamino)-aniline

3

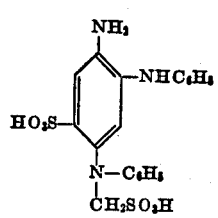

6-(N-sulfomethyl-N-phenyl)-amino-4-phenylamino-3-amino-benzene sulfonic acid

4

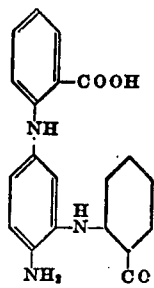

2.4-bis-(o-carboxy-phenylamino)-aniline

5

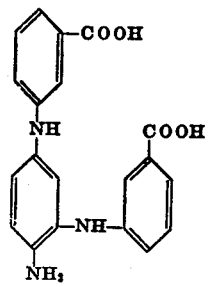

2.4-bis-(m-carboxy-phenylamino)-aniline

6

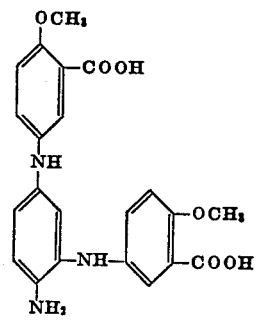

2.4-bis-(p-methoxy-m-carboxy-phenylamino)-aniline

7

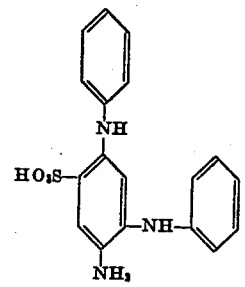

4.6-bis-(phenylamino)-metanilic acid

8

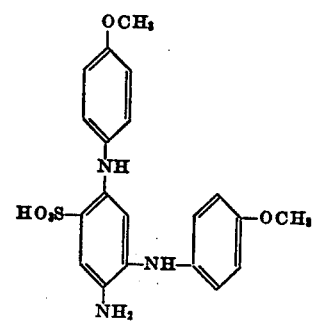

4.6-bis-(p-methoxy-phenylamino)-metanilic acid

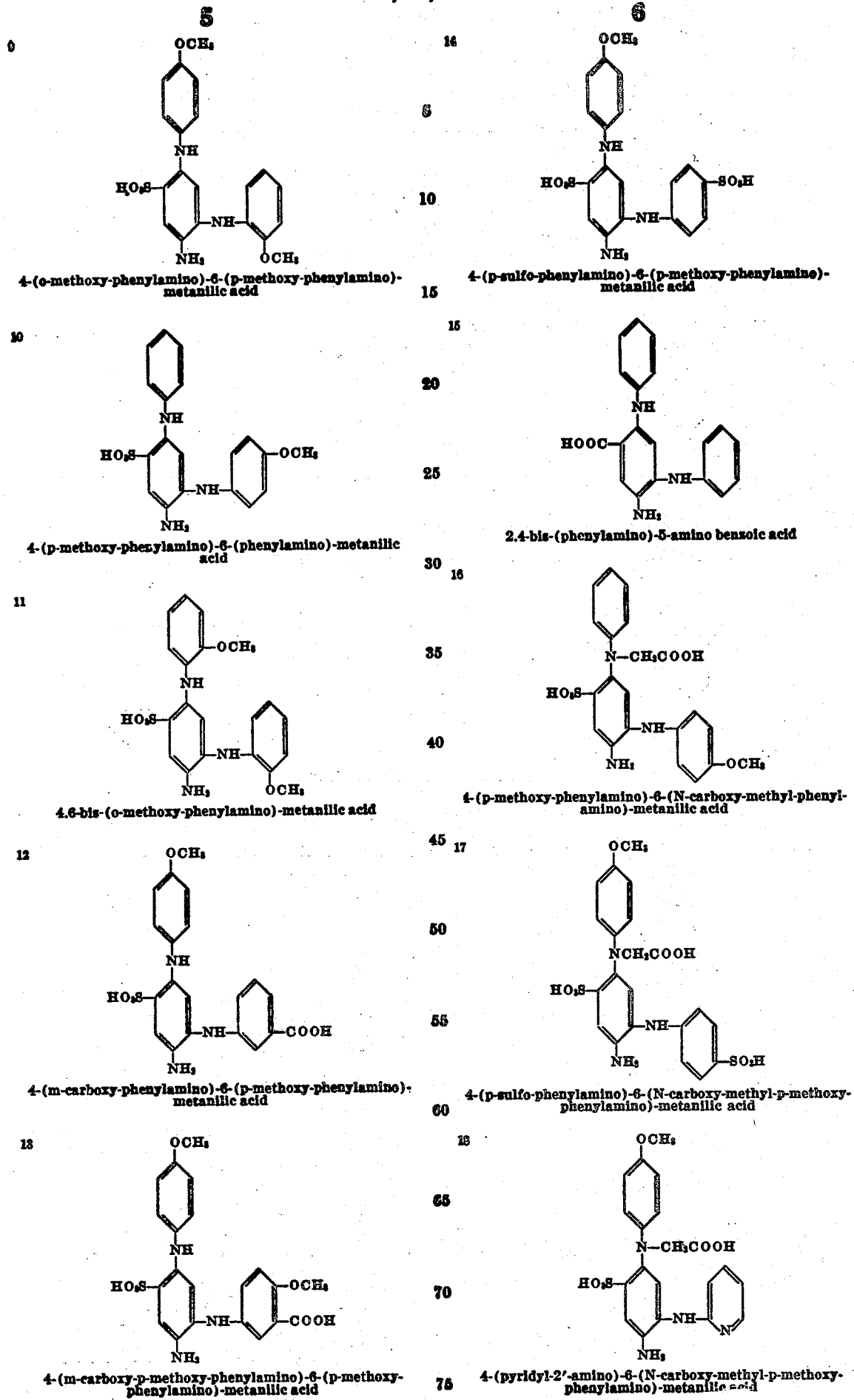

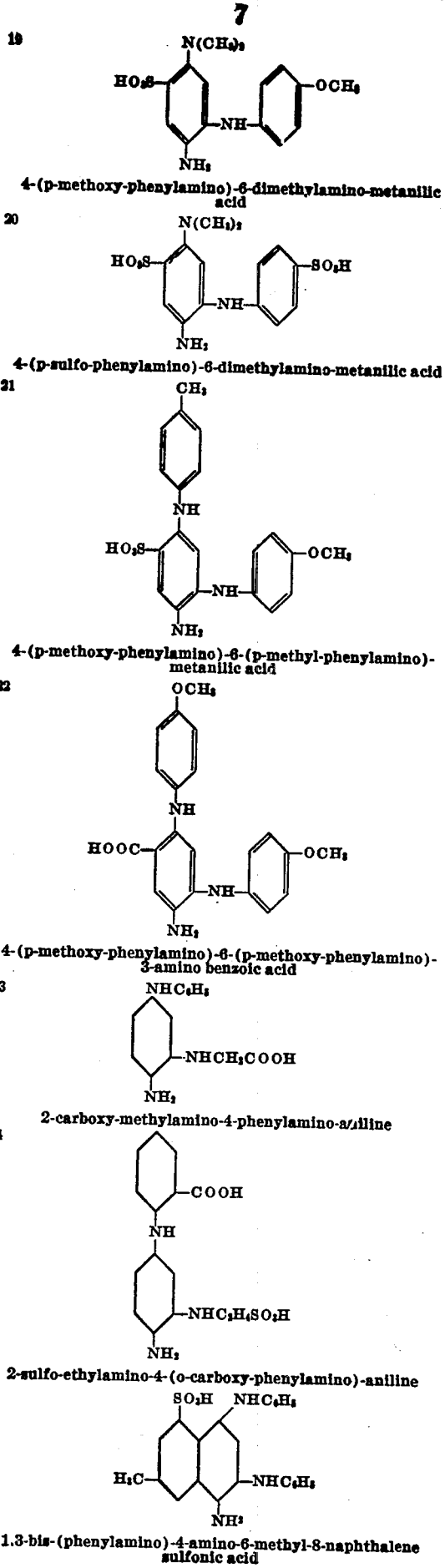
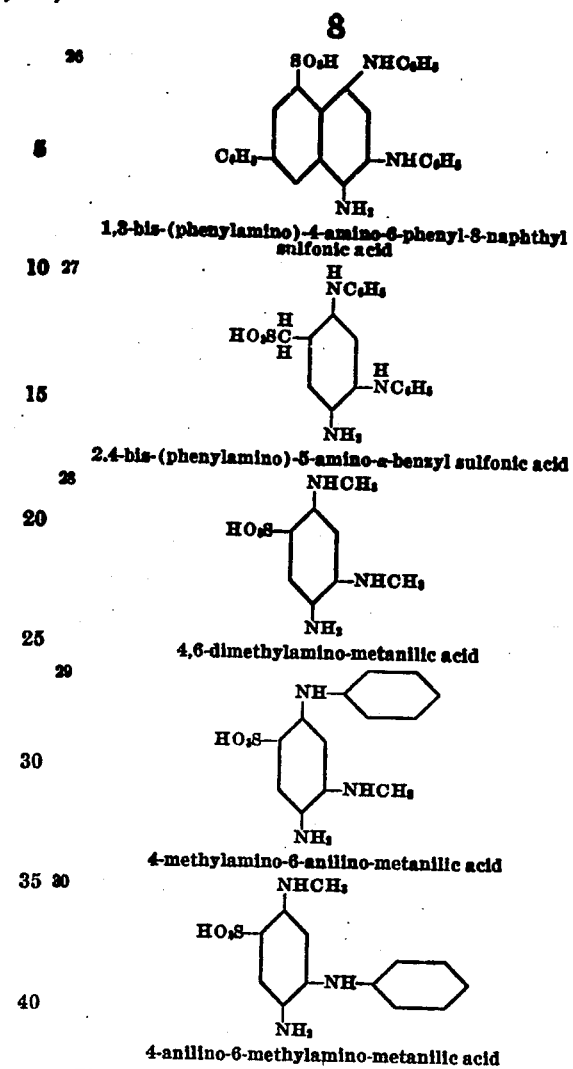

However, best results are obtained with compounds 1, 2, 6 and 28, and these are preferred for the preparation of the phenazonium dyestuff images.

Most of the above compounds or related compounds are known in the literature. In any case, the compounds may be readily synthesized by well-known reactions. For instance, the first compound mentioned is obtained by coupling N,N'-diphenyl-1.3-naphthylenediamine-8-sulfonic acid with diazotized aniline and reducing the resulting azo dye with sodium hydrosulfite. Compounds 25 and 26 may be similarly prepared while starting from the same parent material wherein, however, the naphthyl nucleus is substituted in the 6-position by methyl and phenyl respectively.

The 2nd, 3rd, 4th, 6th, 7th and 23rd compounds may be obtained by condensing resorcinol and the proper amine by the Bucherer reaction and coupling the resulting diamine with a diazonium salt. By reducing the resulting azo dye with hydrosulphite, the required triamines result.

Compounds 5 and 24 are obtained by condensing o-chloro-benzoic acid with 2.4-diamino-nitrobenzene in the presence of copper and reduction of the resulting nitro acid by means of catalytic hydrogenation.

Compounds 7 to 22 inclusive are obtained by the methods described in German Patents 205,350 and 212,472.

Compounds 27 may be obtained by condensing resorcinol with formaldehyde and sodium sulfite to yield a dihydroxybenzyl-sulfonic acid. This is converted to dianilinobenzylsulfonic acid by the Bucherer reaction. The dianilinobenzylsulfonic acid is then converted to the desired compound by azo dye coupling and reduction of the resulting azo dye.

The aromatic triamines depicted above are characterized by their capability of reducing silver halides, i. e., latent images, reversed images, bleached images and the like. As stated, when the reduction of the silver halide takes place in the presence of a color forming component of the usual type, i. e., those containing a reactive methylene group, a phenolic hydroxyl group, a primary amino group bound to an aryl ring, or the like, a dye image is formed in situ with the silver image. With but a few exceptions, the dyes so formed are phenazonium dyes. In certain instances, the initial reaction leads to an observable quinoneimine or indamine dye image. However, by treating such dye images with acids such as dilute hydrochloric, acetic, dilute sulfuric acid or acid reacting solutions such as acid cuprous chloride, the intermediate imine dye image is converted into the phenazonium dye image. For example, if the color forming component is aceto-acetanilide, a yellow dye is first produced by color forming development. This dye upon acidification with dilute hydrochloric acid is converted into a magenta phenazonium dye.

The usual color forming components containing primary amino, phenolic hydroxyl or reactive methylene groups may be utilized for reaction with the oxidation products of the triamine developers in the production of the phenazonium dyes. Examples of such compounds are:

5-sulfo-acetoacetanilide
3-stearoylamino-5-sulfo-acetoacetanilide
2-benzcarbamyl naphthol
3.6-disulfo-8-benzsulfonylamino naphthol
3-phenylamino-aniline
8-benzsulfonyl amino naphthol
3-sulfo-6-aminonaphthol
3-sulfo-6-phenylaminonaphthol
3-sulfo-6-(p-methoxy-phenylamino)-naphthol
1.3-bis-(phenylamino)-8-naphthalene sulfonic acid
3-methsulfonylamino diethylaniline
8-hydroxy quinoline
7-carboxy-8-hydroxy quinoline
Naphthsultam acid
3-sulfo-7-phenylaminonaphthol
1.8-bis-(benzsulfonyl amino)-naphthalene The particular phenazonium dyestuff images which are thus obtained will vary depending upon the specific color formers and specific triamines which are utilized in the process. It may be stated, however, that the phenazonium compounds will have the following general formula:

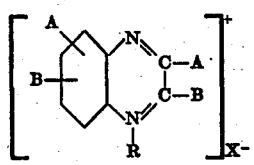

in which A and B are monovalent radicals of the type hereinabove referred to or together represent a six-membered isocyclic ring system such as benzo, naphthyl and the like, R represents an aliphatic or aromatic radical as above, and X represents an acid radical. The mechanism of the developing reaction by which the phenazonium dyes are formed is not definitely known, but it is believed that it may take the following course when using a compound containing a reactive methylene group or a compound containing a phenolic hydroxyl group as the color former:

I

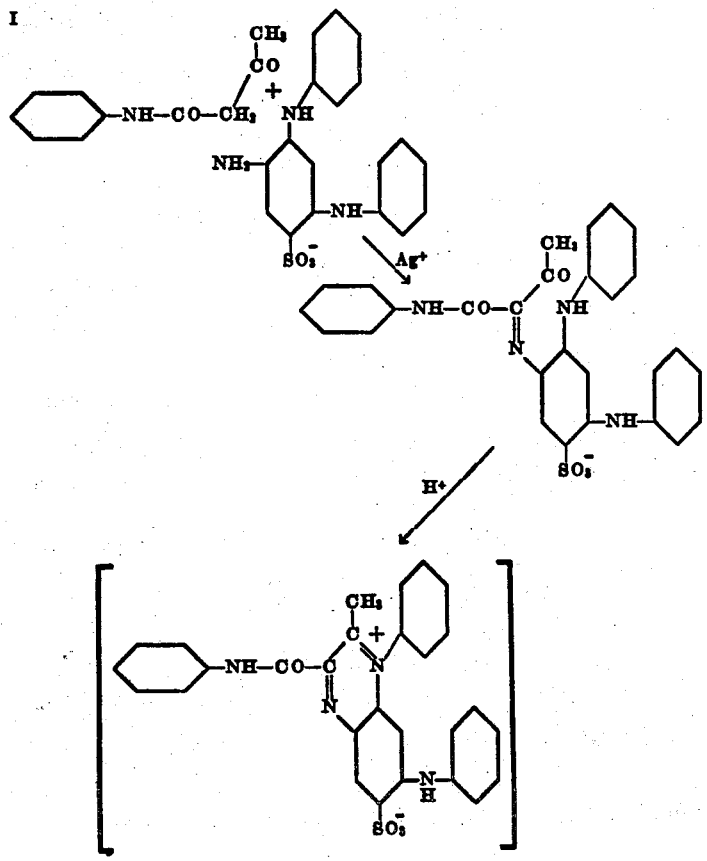

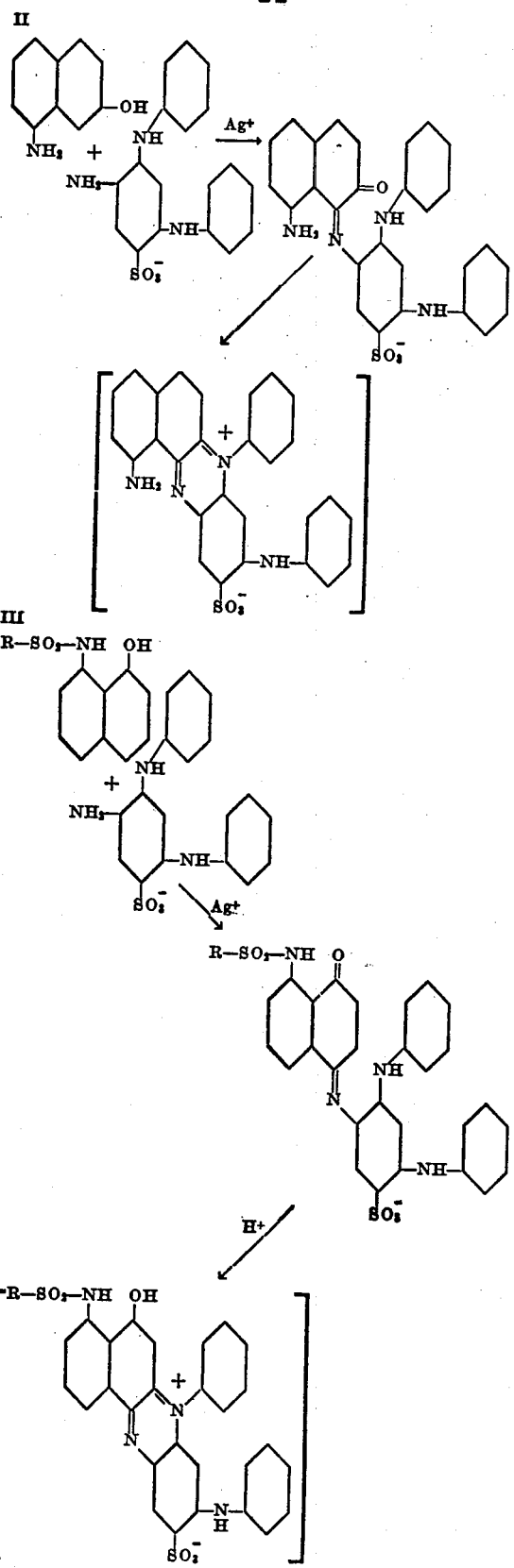

It is to be understood, however, that these reactions are given solely for the purpose of better illustrating the invention and not as definitely pointing out how the reaction occurs.

The process using the new color developers may be effected in various ways. For instance, the color forming component may be located in the developer with the triamine. On the other hand, the color former in non-diffusing form may be located in the emulsion and the triamine in the developer. Multilayer film each layer containing a non-diffusing color former may be used and the entire film color developed to the desired subtractive dyestuff images in a single color forming development step using the triamine as the developer.

While the triamine and an alkali such as sodium carbonate, sodium hydroxide or the like, are the essential components of the developer, it is preferred that the developer also contain the usual adjuncts such as an alkali metal bromide, i. e., potassium bromide, sodium bromide and the like, and an alkali metal sulfite such as sodium sulfite and the like. It has also been found that better results accrue when there is present in the developer a coupling aid in the form of an inorganic or organic base such as pyridine, quinoline, or ammonium hydroxide.

The following examples serve to illustrate the invention but it is to be understood that the invention is not restricted thereto.

*Example I*

A photographic silver bromide emulsion containing 3-stearoylamino-5-sulfo-acetoacetanilide as the color former is exposed, developed in black and white, re-exposed and the residual silver halide developed for 20 minutes in a solution of the following composition:

| | | |
|---|---|---|
| Sodium carbonate monohydrate | grams | 60 |
| Potassium bromide | do | 2 |
| Sodium sulfite | do | 40 |
| Pyridine | ccs | 12 |
| 2.4-bis-(phenylamino)-aniline | grams | 4 |
| Water | ccs | 1000 |

The film after development is bleached with potassium ferricyanide and fixed in an acid hardening hypo solution. There is thus obtained a magenta phenyl-phenazonium dyestuff image which is stable to acids, alkalies and alkali oxidizing agents.

*Example II*

The procedure is the same as in Example I excepting that the 2.4-bis-(phenylamino)-aniline is replaced by 4.6-bis-(phenylamino)-metanilic acid.

*Example III*

The procedure is the same as in Example I excepting that the color former is 8-benzsulfonylamino naphthol and the developer is 4.6-bis-(phenylamino)-metanilic acid.

*Example IV*

The procedure is the same as in Example I excepting that the color former located in the emulsion is 8'-hydroxy quinanilide-2-methyl-3-stearoylamido-5-sulfonic acid and the color developer is 4.6-bis-(phenylamino)-metanilic acid. A magenta phenyl-phenazonium dyestuff image is also obtained in this case.

*Example V*

A silver bromide emulsion containing 3-sulfo-6-oleylamino naphthol is exposed and developed in a developer of the following composition:

| | | |
|---|---|---|
| Sodium carbonate monohydrate | grams | 60 |
| Potassium bromide | do | 2 |
| Sodium sulfite | do | 40 |
| 2.4-bis-(p-methoxy-m-carboxy-phenylamino)-aniline | grams | 4 |
| Water | cc | 1000 |

The film after development is bleached with a potassium ferricyanide bleach and fixed in an acid hardening fixer. There is obtained a negative violet dyestuff image, the dyestuff image being of the phenyl-phenazonium series.

Example VI

The procedure is the same as in Example V excepting that the color forming component located in the emulsion is 3-sulfo-6-(p-octyloxy-phenylamino)-naphthol and the color developer is 4-(p-methoxy-phenylamino)-6-dimethyl amino-metanilic acid. A cyan dyestuff image of the phenyl-phenazonium series is likewise obtained in this instance.

Example VII

A photographic silver halide emulsion is exposed and developed in black and white. The residual silver halide is reexposed and developed in a developer of the following composition:

| | |
|---|---|
| Sodium carbonate monohydrate___grams__ | 60 |
| Potassium bromide_____do____ | 2 |
| Sodium sulfite_____do____ | 40 |
| 6-N-ammonium hydroxide_____cc__ | 20 |
| 4.6-bis-(phenylamino)-metanilic acid __grams__ | 4 |
| 8-benzsulfonylamino naphthol _____do____ | 5 |
| Water _____cc__ | 1000 |

The film after development is bleached with a ferricyanide bleach and fixed in an acid hardening fixer. A positive phenyl-phenazonium dyestuff image purple-blue in color is thereby obtained.

Example VIII

The procedure is the same as in Example VII excepting that the color developer is 4.6-bis-(o-methoxy-phenylamino)-metanilic acid and the color forming component is 3-sulfo-6-amino-naphthol. The phenyl-phenazonium dyestuff image obtained in this case is blue in color.

Example IX

A photographic silver bromide emulsion is exposed and developed in a developer having the following composition:

| | |
|---|---|
| Sodium carbonate monohydrate___grams__ | 60 |
| Potassium bromide_____do____ | 2 |
| Sodium sulfite_____do____ | 40 |
| 4-(p-sulfo-phenylamino)-6 - dimethylamino-metanilic acid_____grams__ | 4 |
| 1.3-bis-(phenylamino)-8-naphthalene sulfonic acid_____grams__ | 5 |
| Water _____cc__ | 1000 |

After bleaching with a ferricyanide bleach and fixing in an acid hardening fixer, there is obtained a purple phenyl-phenazonium dyestuff image.

Example X

The procedure is the same as in Example VII excepting that the color developer is 5-amino-6.8-bis-(phenylamino)-1-naphthalene sulfonic acid and the color forming component is 2-benzcarbamyl naphthol.

The following table will serve to further illustrate the nature of the dyestuff images obtained by utilizing variations of the color developers noted above with different color-forming components:

Table

| Color Former | Color of the dye from developers 2, 3, 4, 5, 6, 7, 8, 9, 10, 11, 12, 13, 14, 15, 16, 17, 18 and 19 | Color of the dye from developers 1; 20 |
|---|---|---|
| CH₃COCH₂CONH— (benzene ring with SO₃H) | Magenta | Magenta. |
| OH, O=C—NC₆H₅ (naphthol) | Red | Blue. |
| C₆H₅SO₂NH, OH, HO₃S—, —SO₃H (naphthalene) | Magenta | |
| NH₂—(ring)—NH—(ring)—COOH | Purple | |
| C₆H₅SO₂NH, OH (naphthalene) | Purple-blue | Greenish blue. |
| OH, H₂N—(naphthalene)—SO₃H | Blue | |

| Color Former | Color of the dye from developers 2, 3, 4, 5, 6, 7, 8, 9, 10, 11, 12, 13, 14, 15, 16, 17, 18 and 19 | Color of the dye from developers 1; 20 |
|---|---|---|
| 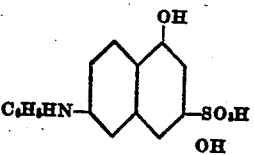 | Greenish Blue | |
| 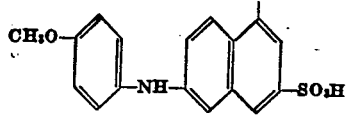 | Cyan | |
| 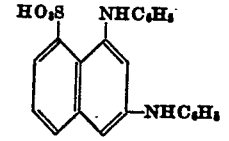 | Purple | |
| 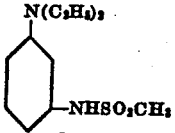 | Blue | Blue. |
| 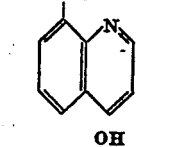 | Magenta | |
| 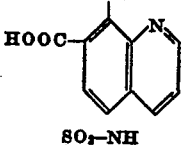 | Purple | |
| 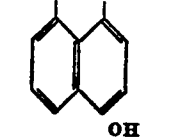 | Magenta | |
|  | do | |
| 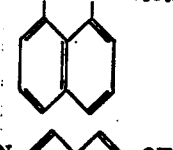 | Blue | |
| 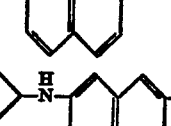 | do | Blue. |
|  | do | Do. |
| 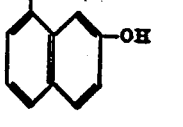 | do | Do. |
|  | do | Do. |

| Color Former | Color of the dye from developers 2, 3, 4, 5, 6, 7, 8, 9, 10, 11, 12, 13, 14, 15, 16, 17, 18 and 19 | Color of the dye from developers 1; 20 |
|---|---|---|
| 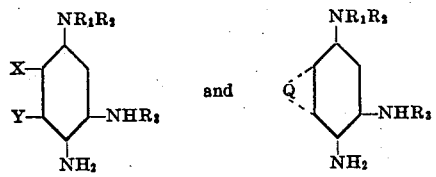 | do | Do. |

We claim:
1. A photographic developer for producing phenazonium dyestuff images on color development containing an aromatic triamine selected from the class consisting of those of the following formulae:

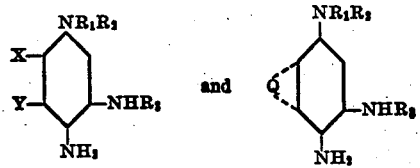

in which $R_1$ is selected from the class consisting of hydrogen and aliphatic radicals, $R_2$ is selected from the class consisting of hydrogen, alkyl and aromatic radicals, $R_3$ is selected from the class consisting of aromatic radicals, a ring carbon atom of which is directly linked to the nitrogen atom and aliphatic radicals a carbon atom of which is directly linked to the nitrogen atom, said carbon atom being substituted by at least two hydrogen atoms, X and Y are selected from the class consisting of hydrogen, sulfo and carboxy, and Q represents the atoms necessary to complete a six-membered isocyclic ring system.

2. A photographic developer as defined in claim 1 containing a color forming component.

3. A photographic developer as defined in claim 1 including a color forming component in which the color forming group is an active methylene group.

4. A photographic developer as defined in claim 1 including a color forming component which contains a phenolic hydroxyl group.

5. A photographic developer as defined in claim 1 including a color forming component which contains a sulfonamide group.

6. The process of producing phenazonium dyestuff images in an exposed silver halide emulsion which comprises developing said emulsion in the presence of a color forming component with a photographic developer containing as the active developing agent an aromatic triamine selected from the class consisting of those of the following formulae:

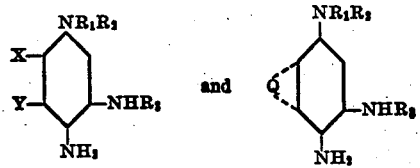

in which $R_1$ is selected from the class consisting of hydrogen and aliphatic radicals, $R_2$ is selected from the class consisting of hydrogen, alkyl and aromatic radicals, $R_3$ is selected from the class consisting of aromatic radicals, a ring carbon atom of which is directly linked to the nitrogen atom and aliphatic radicals a carbon atom of which is directly linked to the nitrogen atom, said carbon atom being substituted by at least two hydrogen atoms. X and Y are selected from the class consisting of hydrogen, sulfo and carboxy, and Q represents the atoms necessary to complete a six-membered isocyclic ring system.

7. The process as defined in claim 6 wherein the color forming component is located in the emulsion.

8. The process as defined in claim 6 wherein the color forming component is located in the developer.

9. A photographic developer for producing phenazonium dyestuff images on color development comprising an alkali and 5-amino-6.8-bis-(phenylamino)-1-naphthalene sulfonic acid.

10. A photographic developer for producing phenazonium dyestuff images on color development comprising an alkali and 2.4-bis-(phenylamino)-aniline.

11. A photographic developer for producing phenazonium dyestuff images on color development comprising an alkali and 2.4-bis-(phenylamino)-metanilic acid.

12. The process of producing phenazonium dyestuff images in silver halide emulsions which comprises developing said emulsion in the presence of a color forming component with a photographic developer containing as the active developing agent 5-amino-6.8-bis-(phenylamino)-1-naphthalene sulfonic acid.

13. The process of producing phenazonium dyestuff images in an exposed silver halide emulsion which comprises developing said emulsion in the presence of a color forming component with a photographic developer containing as the active developing agent 2.4-bis-(phenylamino)-aniline.

14. The process of producing phenazonium dyestuff images in an exposed silver halide emulsion which comprises developing said emulsion in the presence of a color forming component with a photographic developer containing as the active developing agent 4.6-bis-(phenylamino)-metanilic acid.

WILLY A. SCHMIDT.
VSEVOLOD TULAGIN.

REFERENCES CITED

The following references are of record in the file of this patent:

UNITED STATES PATENTS

| Number | Name | Date |
|---|---|---|
| 1,782,356 | Laeuger | Nov. 18, 1930 |
| 1,880,572 | Wendt et al. | Oct. 4, 1932 |
| 1,886,809 | Hess | Nov. 8, 1932 |
| 2,163,166 | Wilmanns et al. | June 20, 1939 |
| 2,193,015 | Weissberger | Mar. 12, 1940 |
| 2,196,739 | Peterson | Apr. 9, 1940 |
| 2,304,953 | Peterson | Dec. 15, 1942 |
| 2,350,109 | Hansen | May 30, 1944 |
| 2,364,350 | Dickey et al. | Dec. 5, 1944 |
| 2,400,872 | Brooker et al. | May 28, 1946 |
| 2,414,491 | Tulagin | Jan. 21, 1947 |